United States Patent [19]

Altounian

[11] Patent Number: 4,771,083

[45] Date of Patent: Sep. 13, 1988

[54] MICRO CELLULAR POLYETHERURETHANE SHOCK ABSORBER

[75] Inventor: George N. Altounian, Cap Rouge, Canada

[73] Assignee: The Goodyear Tire & Rubber Company, Akron, Ohio

[21] Appl. No.: 15,826

[22] Filed: Feb. 17, 1987

[51] Int. Cl.[4] .................... C08G 18/10; C08G 18/14
[52] U.S. Cl. .................................................. 521/159
[58] Field of Search ........................................ 521/159

[56] References Cited

U.S. PATENT DOCUMENTS

| | | | |
|---|---|---|---|
| 3,352,803 | 11/1967 | Hogg et al. | 521/159 |
| 3,789,027 | 1/1974 | Träubel et al. | 521/159 |
| 3,939,021 | 2/1976 | Nishibayashi et al. | 521/159 |
| 3,939,105 | 2/1976 | Jones, Jr. et al. | 521/159 |
| 3,939,123 | 2/1976 | Matthews et al. | 521/159 |
| 4,071,484 | 1/1978 | Sawachika et al. | 521/159 |

Primary Examiner—Harold D. Anderson
Assistant Examiner—Dennis R. Daley
Attorney, Agent, or Firm—J. D. Wolfe; M. R. Dion, Sr.

[57] ABSTRACT

A micro cellular polyetherurethane foam of the aliphatic diisocyanate type suitable for use in shock absorbers.

4 Claims, No Drawings

MICRO CELLULAR POLYETHERURETHANE SHOCK ABSORBER

FIELD OF THE INVENTION

This invention relates to a polyetherurethane micro cellular foam having excellent shock absorbing properties for automobile shocks. More particularly, this invention relates to the polyetherurethane micro cellular foam of an aliphatic diisocyanate and polyether polyols and curatives.

PRIOR ART

Although polyurethanes are known shock absorbers, the McPherson shock used by the Chevrolet Motors Division of General Motors Corporation is very critical and only one of the many types of polyurethanes that have been tried has been approved previously for use to make this shock absorber. This approved polyurethane is a polyester micro cellular foam made with napthalene diisocyanate as the other diisocyanates did not yield satisfactory shocks. Further these approved polyester urethanes are made by a prepolymer process and the prepolymer has a short pot life, no more than about 3 hours as its viscosity becomes uncontrollable and results in the polyurethane losing properties. Thus, the method of manufacturing the prepolymer is critical and its stability during reaction mixing is of short duration. Further polyesters and naphthalene diisocyanate are relatively expensive and have handling problems as the polyester is a solid and the naphthalene diisocyanate is an aromatic material, generally considered hazardous to handle.

THE INVENTION AND THE BEST MODE

This invention provides a polyetherurethane micro cellular foam of an aliphatic diisocyanate that has properties that meet the specifications required by General Motors for the McPherson type shock absorber or the jounce bumper. Thus, a new type of polyurethane shock absorber is available for use which is more economical than the polyester urethane approved systems and the prepolymer used to make the polyetherurethane micro cellular foam has a pot life measured by days instead of a few hours. According to this method a prepolymer is formed by reacting a polyether polyol having preferably about 2.0 to 2.05 hydroxyls of preferably an average molecular weight of 800 to 1000 with an hexane diisocyanate to yield a reaction product having NCO. This prepolymer preferably is mixed with the curative in the presence of sufficient gaseous blowing agent to give a micro cellular foam, preferably having a specific gravity of the desired product.

The nature of this invention, its advantages and benefits can be more readily appreciated and understood by reference to the following illustrative and representative examples where all parts and percentages are by weight unless otherwise indicated.

EXAMPLE 1

A polyether urethane prepolymer was made by mixing the following ingredients set forth in Table I.

TABLE I

| Mixing Order | Materials | % |
|---|---|---|
| 1. | Polytetramethylene ether glycol 1000 molecular weight | 64.975 |
| 2. | Water | 0.074 |
| 3. | Trimethylolpropane | 0.810 |
| 4. | Hydrochloric acid | 0.004 |
| 5. | Hexamethylene diisocyanate | 19.661 |
| 6. | Hexamethylene diisocyanate | 14.48 |
| | TOTAL | 100 |

It should be noted that the first item to be mixed is a solid at room temperature and melts at 20° to 25° C. The third item mixed is a solid powder that melts at 56° to 58° C. and the hexamethylene diisocyanate is a liquid at room temperature. To facilitate the mixing of the above materials items 1, 2, 3 and 4 are heated and mixed in a reactor at 32° C. Then item 5, part of the isocyanate, is introduced into the reactor with mixing and the temperature is held between 32°-35° C. for 30 minutes. After 30 minutes the contents of the reactor are heated progressively to raise the temperature to 105° C. within two hours. The temperature is held at 105° for 60 minutes before starting to cool. At this time item 6, the rest of the isocyanate, is added and cooling continues until temperature is below 70° C. The resulting prepolymer has a free NCO content of about 10.51% and an equivalent weight of about 400.

The polyol curative was made by mixing the ingredients in Table 2 in the order shown.

TABLE 2

| Mixing Order | Materials | % |
|---|---|---|
| 1. | Niax 34-28 | 47.92 |
| 2. | Cyclohexane dimethanol | 26.84 |
| 3. | N—phenol dialthanol amine | 5.59 |
| 4. | Polypropylene ether polyol molecular weight | 10.62 |
| 5. | Water | 1.12 |
| 6. | Polytetramethylene ether glycol molecular weight - 1000 | 4.87 |
| 7. | Triethylene diamine | 0.53 |
| 8. | Niax A-1 | 0.24 |
| 9. | Tin catalyst | 0.19 |
| 10. | Freon 113, fluorocarbon blowing agent | 1.121 |
| 11. | L5303 - silicone surfactant | 0.96 |
| | TOTAL | 100 |

In a suitable reactor items 1 and 2 are added and item 3 at 65° C. is added to the melted material in the reactor with mixing before being cooled to 40° C. Then items 7, 8, 9, 10 and 11 are added and the mixing is continued for 20 minutes. The curative is a liquid.

To prepare the micro cellular foam, the prepolymer is heated to 70° C. and mixed with the polyol curative at 40° C. preferably in a mixing bead having a dynamic mixer with a minimum rotation rate of 3000 rpm. A preferred weight ratio of the prepolymer to the polyol curative is about 2.55 to 1. The mixture from the mixing heat is preferably added to a preheated mold at 55°-65° C. The molded article, for instance, the jounce bumper, preferably is held at the preheat temperature for about 30 minutes or more before being demolded. The better physical-mechanical properties are obtained by a post heat treatment at about 105° C. for 12 to 16 hours and a 7 day longer storage at room temperature.

The micro cellular foam had the following properties.

| Properties | System | Specification |
| --- | --- | --- |
| Specific gravity | 0.62 | 0.35 minimum |
| Tear resistance N/m | 9000–1100 | 10,000 |
| Tensile strength Kpa | 3300–3600 | 3,000 |
| Permanent deformation | 9.4–9.9 | 15% maximum |
| Cold rigidity (−40° C.) | No cracks | No cracks |

Not only did the bumper made by this example meet the specification but it had approximately a 30–35% cost advantage relative to the approved polyester naphthalene diisocyanate urethane foam. In addition, it has better pot life and thus produces less reject material.

While certain representative embodiments and details have been shown for the purpose of illustrating the invention, it will be apparent to those skilled in this art that various changes and modifications may be made therein without departing from the scope of the invention made therein without departing from the scope of the invention.

What is claimed is:

1. An improved polyetherurethane micro cellular foam bumper consisting essentially of a reaction product of a polyether polyol having from 2 to about 4 hydroxyl groups and an averaged value of about 2.0 to 2.1 with hexamethylene diisocyanate to form a prepolymer containing free NCO and curing said prepolymer in the presence of essentially sufficient curative to react with the free NCO in the presence of a gaseous blowing agent to yield a foam, said polyether polyol being a blend of 95 to 99 percent by weight of polytetramethylene ether glycol of about 1000 molecular weight and 5 to 1 percent of polyol of 3 to 4 hydroxyl of less than 300 molecular weight.

2. The polyetherurethane of claim 1 wherein the curative is a blend of polypropylene ether polyol and polytetramethylene ether glycol.

3. The bumber according to claim 1 wherein the bumber has a specific gravity of about 0.62, tear resistance of 9,000 to 11,000 N/M, tensile strength of 3,300 to 3,600 kPa and a permanent deformation of 9.4 to 9.9 percent.

4. A polyetherurethane micro cellular foam consisting essentially of a reaction product of a polyether polyol having from 2 to about 4 hydroxyl groups and an averaged value of about 2.0 to 2.1 with hexamethylene diisocyanate to form a prepolymer containing free NCO and curing said prepolymer in the presence of essentially sufficient curative to react with the free NCO in the presence of a gaseous blowing agent to yield a foam, said polyether polyol being a blend of 95 to 99 percent by weight of polytetramethylene ether glycol of about 1000 molecular weight and 5 to 1 percent of polyol of 3 to 4 hydroxyl of less than 300 molecular weight.

* * * * *